United States Patent
Yu et al.

(10) Patent No.: US 8,683,500 B2
(45) Date of Patent: Mar. 25, 2014

(54) OPTICAL DISC DRIVE INCLUDING GUIDE SHAFT SUPPORTING STRUCTURE

(75) Inventors: Heon-seung Yu, Suwon-si (KR); Seong-yeon Park, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/600,557

(22) Filed: Aug. 31, 2012

(65) Prior Publication Data

US 2013/0061255 A1 Mar. 7, 2013

(30) Foreign Application Priority Data

Sep. 6, 2011 (KR) .................... 10-2011-0090207

(51) Int. Cl.
*G11B 7/085* (2006.01)

(52) U.S. Cl.
USPC .......................................................... 720/677

(58) Field of Classification Search
USPC .......................................................... 720/677
See application file for complete search history.

(56) References Cited

U.S. PATENT DOCUMENTS

| | | | |
|---|---|---|---|
| 7,219,357 B2 * | 5/2007 | Furuya et al. ................ | 720/675 |
| 7,610,591 B2 * | 10/2009 | Wan et al. .................... | 720/677 |
| 2004/0027962 A1 | 2/2004 | Kabasawa | |
| 2005/0216928 A1 * | 9/2005 | Hara et al. ................... | 720/677 |
| 2006/0200840 A1 * | 9/2006 | Lee et al. ..................... | 720/677 |
| 2007/0050798 A1 * | 3/2007 | Watanabe .................... | 720/677 |
| 2007/0283373 A1 * | 12/2007 | Yang ............................ | 720/677 |

FOREIGN PATENT DOCUMENTS

KR 10-2003-0063920 7/2003

* cited by examiner

*Primary Examiner* — Mark Blouin
(74) *Attorney, Agent, or Firm* — NSIP Law

(57) ABSTRACT

Provided is a shaft supporting structure, an optical pickup moving structure including the shaft supporting structure, and an optical disc drive. The shaft supporting structure includes a base chassis, a shaft installed on the base chassis, an axis support that supports an end of the shaft, and a rotatable locker for preventing the shaft from being separated from the axis support.

11 Claims, 5 Drawing Sheets ized to fix the shaft to the base. In various devices, it is desirable for the shaft to have a small size and a coupling structure for supporting the shaft that is also small in size.

OPTICAL DISC DRIVE INCLUDING GUIDE SHAFT SUPPORTING STRUCTURE

CROSS-REFERENCE TO RELATED APPLICATION(S)

This application claims the benefit under 35 USC §119(a) of Korean Patent Application No. 10-2011-0090207, filed on Sep. 6, 2011, in the Korean Intellectual Property Office, the entire disclosure of which is incorporated herein by reference for all purposes.

BACKGROUND

1. Field

The following description relates to an optical pickup and a disc drive including the same, and more particularly, to a guide shaft supporting structure for the optical pickup.

2. Description of Related Art

A guide shaft that extends in one direction is used in various mechanical fields. A shaft is fixed to a base for supporting the shaft. Typically, a coupling structure is used to fix the shaft to the base. In various devices, it is desirable for the shaft to have a small size and a coupling structure for supporting the shaft that is also small in size.

An optical pickup moving structure of a disc drive is an example of an electronic device using a shaft. An optical pickup is generally supported by a guide shaft so as to reciprocally move in a radial direction of a disc. Conventionally, the guide shaft is fixed to a base chassis by a complex coupling structure that includes a plurality of screws. In an optical pickup moving structure, there is a desire to stably couple components to each other while at the same time reducing the number of components in terms of manufacturing costs.

SUMMARY

In an aspect, there is provided a shaft supporting structure including a base chassis, a guide shaft installed on the base chassis for guiding a pickup unit of an optical disc drive, an axis support that supports an end of the guide shaft with respect to the base chassis, and a rotatable locker for preventing the guide shaft from being separated from the axis support.

The axis support and the rotatable locker may form an insert molding structure formed on the base chassis.

The axis support may comprise an accommodation groove into which the end of the shaft is inserted.

The rotatable locker may be rotatably installed at a position that is adjacent to the accommodation groove, and the rotatable locker may comprise a rotation axis that is rotatably fixed to the base chassis.

In an aspect, there is provided an optical disc drive including a main frame to receive an optical disc, the optical disc drive including an optical pickup unit configured to read data and/or to write data to the optical disc, and configured to slide in a radial direction of the optical disc, and a base chassis installed inside the main frame, the base chassis comprising a guide shaft configured to provide motive force to slide the optical pickup unit, an axis support that supports an end of the guide shaft with respect to the base chassis, and a rotatable locker for preventing the guide shaft from being separated from the axis support.

The axis support and the rotatable locker may form an insert molding structure formed on the base chassis.

The axis support may comprise an accommodation groove into which the end of the shaft is inserted.

The optical disc drive may further comprise a guide rail that is disposed on the base chassis in parallel to the guide shaft, wherein movement of the optical pickup unit is guided by the guide shaft and the guide rail.

The optical disc drive may further comprise a spindle motor installed on the base chassis to drive the optical disc, wherein the axis support and the spindle motor are installed on opposing ends of the guide shaft, respectively.

The guide shaft may be configured to rotate while the end of the guide shaft is held in place by the rotatable locker.

In an aspect, there is provided an optical disc drive including an optical pickup unit configured to read data and/or to write data to an optical disc, and configured to slide in a radial direction of the optical disc, a spindle motor configured to drive the optical disc, a base chassis on which the optical pickup unit and the spindle motor are installed, a guide shaft installed on the base chassis to guide movement of the optical pickup unit, an axis support that supports an end of the guide shaft, and a rotatable locker for preventing the guide shaft from being separated from the axis support.

The axis support and the rotatable locker may form an insert molding structure formed on the base chassis.

The axis support may comprise an accommodation groove into which the end of the shaft is inserted.

The optical disc drive may further comprise a guide rail that is disposed on the base chassis in parallel to the guide shaft, wherein movement of the optical pickup unit is guided by the guide shaft and the guide rail.

The axis support and the spindle motor may be installed on opposing ends of the guide shaft, respectively.

Other features and aspects may be apparent from the following detailed description, the drawings, and the claims.

Figure 1:
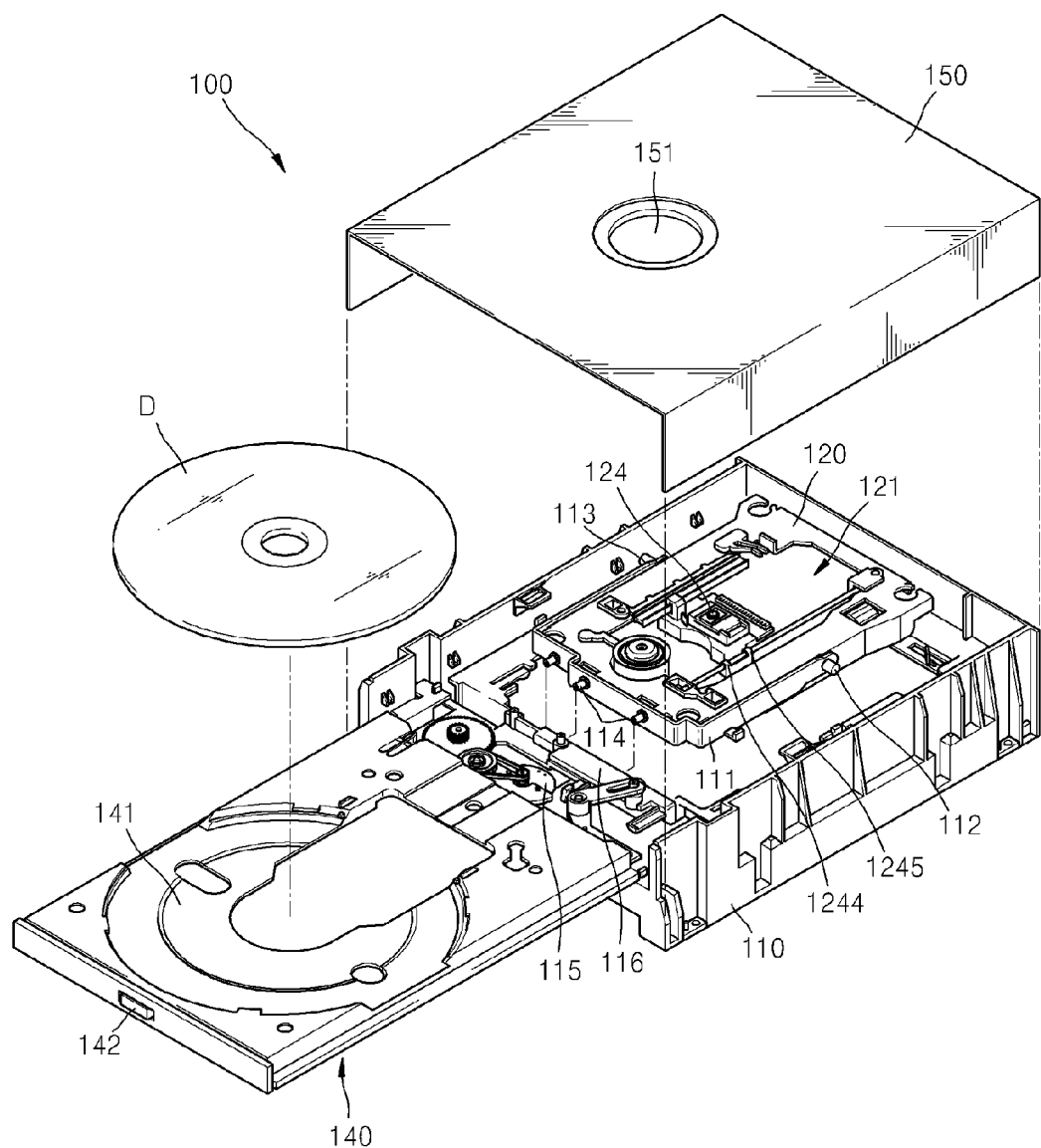
FIG. 1 is diagram illustrating an example of an exploded view of an optical disc drive including a shaft supporting structure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 2:
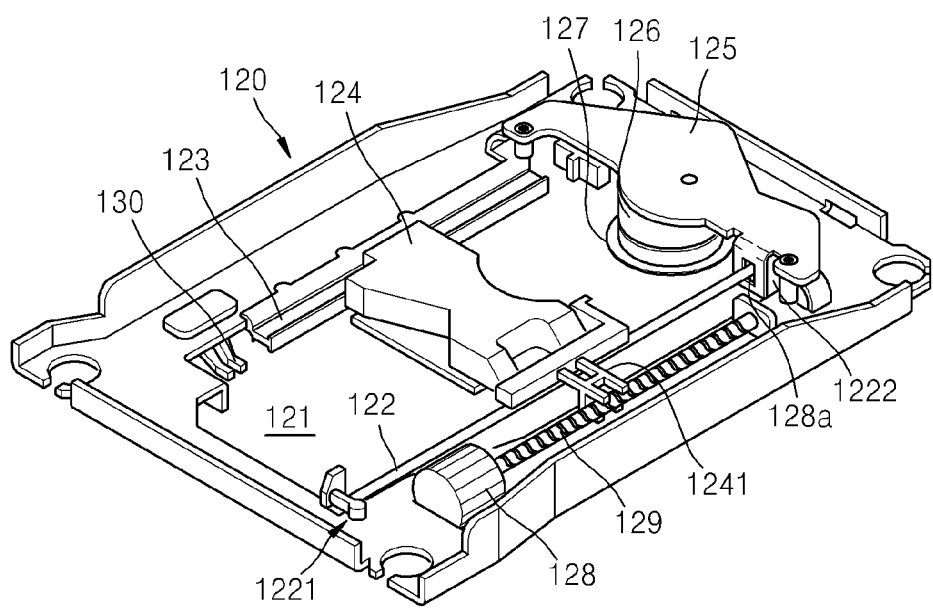
FIG. 2 is a diagram illustrating an example of a main base shown in FIG. 1 viewed from underneath the main base.

FIG. 1 illustrates an example of an exploded view of an optical disc drive 100 including a shaft supporting structure. FIG. 2 illustrates an example of a main frame 110 included in the optical disc drive 100 of FIG. 1 and viewed from underneath. For example, the optical disc drive 100 may be included in a terminal such as a computer, a DVD player, a Blu-ray player, a compact disc player, a television, a video game console, and the like.

Referring to FIGS. 1 and 2, the optical disc drive 100 includes the main frame 110, a tray 140 that may be pushed into and out of the main frame 110, a sub frame 111 that is rotatably installed on the main frame 110, and a base chassis 120 that is supported by the sub frame 111. In this example, the tray 140 includes an installation unit 141 on which a disc D may be inserted, for example, by a user.

A sliding member 116 is installed in the main frame 110 to slide in conjunction with a driving motor 115 in a direction that is perpendicular to a direction in which the tray 140 is pushed into and out of the main frame 110. A plurality of cam holes or a guide (not shown) corresponding to a plurality of cam protrusions 114 installed on the sub frame 111 may be installed in the sliding member 116. Accordingly, the sub frame 111 may be moved in up and down directions with respect to rotation axes 112 and 113, which are supported by the main frame 110, in synchronization with reciprocal movement of the sliding member 116. In this example, the base chassis 120 may also be moved by the sub frame 111.

The base chassis 120 has a quadrangular edge and an opening 121 that has an approximately quadrangular shape and that is located in a central portion of the base chassis 120. Referring to FIG. 2, when viewed from underneath, the opening 121 includes a turntable 127 on which the disc D accommodated on the tray 140 is installed, a spindle motor 126 that is coaxially installed with the turntable 127 and which rotates the turntable 127, and a pickup unit 124 that slides in a radial direction of the disc D accommodated on the turntable 127 to record information on the disc D or to reproduce information that is recorded on the disc D.

As shown in FIG. 2, the spindle motor 126 is fixed to the base chassis 120 by a motor base 125. The guide shaft 122 is fixed to the base chassis 120 by a first fix unit 1221 and the second fix unit 1222 that are formed on opposite end portions of the guide shaft 122. A protection unit 128a covers the second fix unit 1222 and is formed on one side of the spindle motor 126. The protection unit 128a has a quadrangular through hole through which a guide shaft 122 passes and which compensates for the mechanical strength of the second fix unit 1222.

Figure 3:
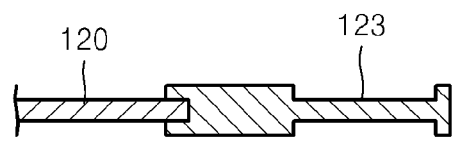
FIG. 3 is a diagram illustrating a cross-sectional view of a guide rail for supporting an optical pickup in the base chassis shown in FIGS. 1 and 2.
Figure 4:
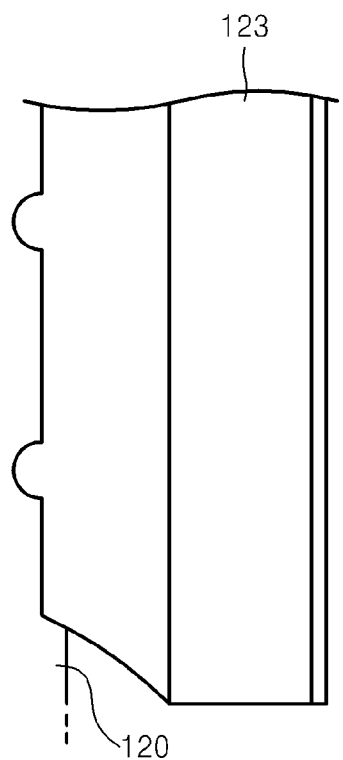
FIG. 4 is a diagram of a plan view of the guide rail shown in FIG. 3.

The opening 121 of the base chassis 120 is formed between the guide shaft 122 and a guide rail 123. The guide shaft 122 and the guide rail 123 face each other in a longitudinal direction (a direction in which the tray 140 is pushed out of or into the main frame 110). The guide shaft 122 and the guide rail 123 guide the pickup unit 124 into and out of the base chassis 120. As shown in FIGS. 3 and 4, the guide rail 123 has one lateral portion with respect to the longitudinal direction, which is fixed to an internal edge portion of the base chassis 120. For example, the guide rail 123 may be a plastic mold part that is molded directly on the base chassis 120.

As shown in FIGS. 1 and 2, a step motor 128 and a lead screw 129 are installed adjacent to the guide shaft 122. The lead screw 129 rotates in conjugation with the step motor 128. Further, the lead screw 129 is connected to the pickup unit 124 to linearly reciprocate the pickup unit 124 in a radial direction of the disc D. The pickup unit 124 and the lead screw 129 are each connected to a pickup guide 1241 such that power may be transferred by the lead screw 129 to the pickup guide 1241 fixed to the pickup unit 124 thereby moving the pickup unit 124.

Referring to FIG. 1, the guide shaft 122 passes through two connection units 1244 and 1245 which are formed on one side of the pickup unit 124 such that the pickup unit 124 may be slidably installed on the guide shaft 122. In addition, the other side of the pickup unit 124 contacts the guide rail 123 so as to slide.

Referring to FIG. 2, a damper 130 is installed adjacent to an end of the guide rail 123 to protect the pickup unit 124, for example, when abnormal external shock is applied to the optical disc drive 100. The damper 130 may be installed on one side of the guide rail 123, for example, an opposite side to the spindle motor 126. The damper 130 may include various forms. As another example, a plurality of dampers may be installed adjacent to a moving path of a pickup unit.

Referring again to FIG. 1, a switch 142 may be installed on a front surface of the tray 140 and may output a signal for loading or unloading the tray 140 to or from the main frame 110. An upper surface 150 of the main frame 110 includes a clamper 151 for clamping the disc D installed on the turn table 127.

Figure 5:
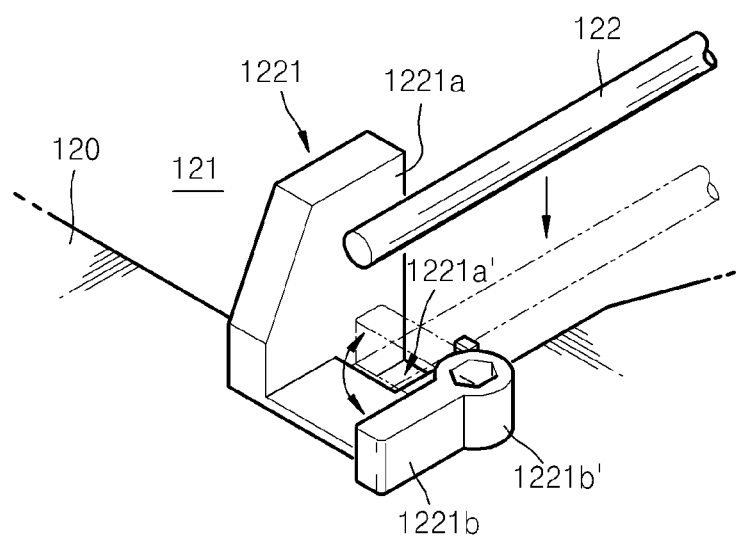
FIG. 5 is a diagram illustrating an example of a shaft fix unit included in a shaft supporting structure.

The first and second fix units 1221 and 1222 may each be formed of a plastic mold. As shown in FIGS. 2 and 5, the first fix unit 1221 includes an axis support 1221a for supporting one end of the guide shaft 122 and a rotatable locker 1221b for preventing the shaft 122 supported by the axis support 1221a from being separated from the axis support 1221a. The axis support 1221a further includes an accommodation groove 1221a' into which the end of the guide shaft 122 is inserted. In this example, when the end of the guide shaft 122 is in the accommodation groove 1221a', the guide shaft 122 can still rotate even while the rotatable locker 1221b is position above the guide shaft 122 (i.e. in a closed position).

Figure 6:
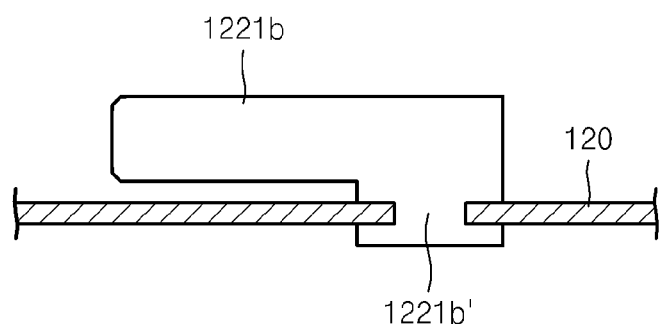
FIG. 6 is a diagram illustrating an example of the rotatable locker shown in FIG. 5 that is coupled to a base chassis.

Referring to FIGS. 5 and 6, the rotatable locker 1221b includes a rotation axis 1221b' that is rotatably coupled to the base chassis 120. Accordingly, the rotatable locker 1221b may rotate about the base chassis 120 as shown in FIG. 6. Both of the axis support 1221a and the rotatable locker 1221b may be fixed to the base chassis 120.

According to various aspects, the axis support 1221a and the rotatable locker 1221b may be molded in the base chassis 120 to form an insert mold structure and may be permanently fixed to the base chassis 120.

According to various aspects, the axis support 1221a may be installed on one end of the guide shaft 122 and the spindle motor 126 may be installed on the other end of the guide shaft 122 in order to prevent the spindle motor 126 and the rotatable locker 1221b from interfering with each other.

Figure 7:
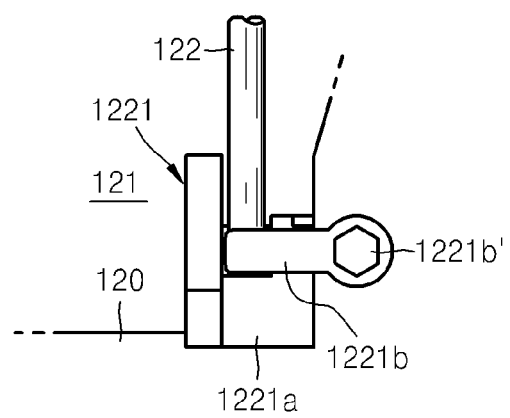
FIGS. 7 and 8 are diagrams illustrating examples in which a shaft is fixed and released by the rotatable locker shown in FIGS. 5 and 6.
Figure 8:
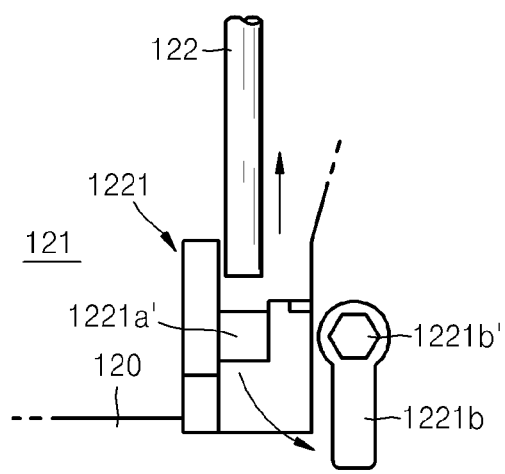

When the main frame 110 includes the structure as shown in FIG. 2, a separate coupling component is not required to fix the guide shaft 122 to the base chassis 120. For example, as shown in FIG. 7, when the guide shaft 122 is inserted into the axis support 1221a installed on the base chassis 120, the guide shaft 122 may be stably fixed using the rotatable locker 1221b. In this example, the rotatable locker 1221b may be easily separated from the axis support 1221a by rotating the rotatable locker 1221b so as to separate the guide shaft 122 from the axis support 1221a, as shown in FIG. 8. While the rotatable locker 1221b is separated from the axis support 1221a, the end of the guide shaft 122 can be easily removed from the axis support 1221a. Accordingly, a separate coupling component is not required and separate equipment for fixing and separating the guide shaft 122 is not required.

In various aspects herein, a structure in which movement of a pickup unit is guided by a single guide shaft and a single guide rail is described. However, if movement of a pickup unit is guided by multiple guide shafts installed on opposite sides, like in a conventional optical disc drive, the shaft fix structures may be applied to each of the multiple guide shafts.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A shaft supporting structure comprising:
    a base chassis;
    a guide shaft installed on the base chassis for guiding a pickup unit of an optical disc drive;
    a fix unit comprising an axis support that supports an end of the guide shaft with respect to the base chassis; and
    a rotatable locker for preventing the guide shaft from being separated from the axis support,
    wherein the rotatable locker comprises a rotation axis that is rotatably fixed to the base chassis and has a finite distance from a longitudinal axis of the guide shaft, the axis support comprises an accommodation groove into which the end of the shaft is inserted, and the rotatable locker is rotatably installed at a position that is adjacent to the accommodation groove.

2. The shaft supporting structure of claim 1, wherein the axis support and the rotatable locker form an insert molding structure formed on the base chassis.

3. An optical disc drive including a main frame to receive an optical disc, the optical disc drive comprising:
    an optical pickup unit configured to read data and/or to write data to the optical disc, and configured to slide in a radial direction of the optical disc; and
    a base chassis installed inside the main frame, the base chassis comprising a guide shaft configured to provide motive force to slide the optical pickup unit, an axis support that supports an end of the guide shaft with respect to the base chassis, and a rotatable locker for preventing the guide shaft from being separated from the axis support,
    wherein the rotable locker comprises a rotation axis that is rotatably fixed to the base chassis and has a finite distance from a longitudinal axis of the guide shaft, the axis support comprises an accommodation groove into which the end of the shaft is inserted, and the rotatable locker is rotatably installed at a position that is adjacent to the accommodation groove.

4. The optical disc drive of claim 3, wherein the axis support and the rotatable locker form an insert molding structure formed on the base chassis.

5. The optical disc drive of claim 3, further comprising a guide rail that is disposed on the base chassis in parallel to the guide shaft,
    wherein movement of the optical pickup unit is guided by the guide shaft and the guide rail.

6. The optical disc drive of claim 5, further comprising a spindle motor installed on the base chassis to drive the optical disc,
    wherein the axis support and the spindle motor are installed on opposing ends of the guide shaft, respectively.

7. The optical disc drive of claim 3, wherein the guide shaft is configured to rotate while the end of the guide shaft is held in place by the rotatable locker.

8. An optical disc drive comprising:
    an optical pickup unit configured to read data and/or to write data to an optical disc, and configured to slide in a radial direction of the optical disc;
    a spindle motor configured to drive the optical disc;
    a base chassis on which the optical pickup unit and the spindle motor are installed;
    a guide shaft installed on the base chassis to guide movement of the optical pickup unit;
    an axis support that supports an end of the guide shaft; and
    a rotatable locker for preventing the guide shaft from being separated from the axis support,
    wherein the rotatable locker comprises a rotation axis that is rotatably fixed to the base chassis and has a finite distance from a longitudinal axis of the guide shaft, the axis support comprises an accommodation groove into which the end of the shaft is inserted, and the rotatable locker is rotatably installed at a position that is adjacent to the accommodation groove.

9. The optical disc drive of claim 8, wherein the axis support and the rotatable locker form an insert molding structure formed on the base chassis.

10. The optical disc drive of claim 8, further comprising a guide rail that is disposed on the base chassis in parallel to the guide shaft,
    wherein movement of the optical pickup unit is guided by the guide shaft and the guide rail.

11. The optical disc drive of claim 10, wherein the axis support and the spindle motor are installed on opposing ends of the guide shaft, respectively.

* * * * *